US012281451B2

(12) United States Patent
Zhang et al.

(10) Patent No.: US 12,281,451 B2
(45) Date of Patent: Apr. 22, 2025

(54) TOP-DOWN CONSTRUCTION-TYPE ASSEMBLY CONSTRUCTION METHOD FOR PAVED ROAD SURFACE

(71) Applicants: THE FIRST ENGINEERING CO., LTD. OF CTCE GROUP, Hefei (CN); China Railway NO.4 Group Co., LTD, Hefei (CN)

(72) Inventors: Jiesheng Zhang, Hefei (CN); Yangjie Jiang, Hefei (CN); Fengchun Dong, Hefei (CN); Wu Huang, Hefei (CN); Anhui Wang, Hefei (CN); Shengyun He, Hefei (CN); Jingyi Li, Hefei (CN); Shijun Pi, Hefei (CN); Lingjian Kong, Hefei (CN); Ning Zhao, Hefei (CN); Zhuoyi Wei, Hefei (CN); Shuguo Xu, Hefei (CN); Ying Wang, Hefei (CN); Can Jiang, Hefei (CN); Bo Zhang, Hefei (CN)

( * ) Notice: Subject to any disclaimer, the term of this patent is extended or adjusted under 35 U.S.C. 154(b) by 0 days.

(21) Appl. No.: 18/929,501

(22) Filed: Oct. 28, 2024

(65) Prior Publication Data

US 2025/0075441 A1 Mar. 6, 2025

Related U.S. Application Data

(63) Continuation of application No. PCT/CN2024/074963, filed on Jan. 31, 2024.

(30) Foreign Application Priority Data

Aug. 31, 2023 (CN) .......................... 202311113837.2

(51) Int. Cl.
*E01C 5/00* (2006.01)
*E01C 5/22* (2006.01)
(Continued)

(52) U.S. Cl.
CPC .............. *E01C 5/223* (2013.01); *E01C 5/001* (2013.01); *E01C 19/52* (2013.01); *B28B 23/005* (2013.01)

(58) Field of Classification Search
None
See application file for complete search history.

(56) References Cited

U.S. PATENT DOCUMENTS

| | | | | |
|---|---|---|---|---|
| 10,060,144 | B1 * | 8/2018 | Francies, III | E04G 21/10 |
| 10,597,871 | B2 * | 3/2020 | Recker | E04C 2/06 |
| 11,976,427 | B2 * | 5/2024 | Nguyendinh | E04G 21/10 |

FOREIGN PATENT DOCUMENTS

| | | | |
|---|---|---|---|
| AT | A210894 A | | 1/1998 |
| CN | 104929012 A | * | 9/2015 |

(Continued)

OTHER PUBLICATIONS

Internation Search Report of PCT/CN2024/074963, Mailed Apr. 11, 2024.

*Primary Examiner* — Christopher J Sebesta
*Assistant Examiner* — Katherine J Chu

(57) ABSTRACT

A top-down construction type assembly construction method for paved road surface, including the following steps: step I, manufacturing prefabricating slabs: using a top-down method to manufacture the prefabricating slabs, and providing bolt sleeves, inside the prefabricating slabs, which are evenly arranged in the prefabricating slabs; step II, mounting the prefabricating slabs: on a lower bearing plate, placing the prefabricating slabs in one step, performing a fine tuning on a position and an altitude of the prefabricating slabs, performing a grouting construction, finally forming the paved road surface; the prefabricating slabs are manufactured by laying bricks and pouring concrete, the prefabricating slabs are rolled over and mounted, thus eliminating on-site concrete bonding between bricks (Continued)

and the lower bearing plate, improving overall stability of the bricks and the prefabricating slabs after being mounted, assembled mounting for a paved road surface is implemented, and the construction period is shortened.

9 Claims, 9 Drawing Sheets

(51) Int. Cl.
*E01C 19/52* (2006.01)
*B28B 23/00* (2006.01)

(56) References Cited

FOREIGN PATENT DOCUMENTS

| | | | | | |
|---|---|---|---|---|---|
| CN | 107513916 | A | * | 12/2017 | ............. E01C 9/007 |
| CN | 108756263 | A | | 11/2018 | |
| CN | 115305765 | A | | 11/2022 | |
| CN | 117328308 | A | | 1/2024 | |
| CN | 118375016 | A | * | 7/2024 | |
| CN | 221798048 | U | * | 10/2024 | |
| JP | 04120302 | A | * | 4/1992 | |
| JP | 09100503 | A | * | 4/1997 | |
| JP | 3581534 | B2 | * | 10/2004 | |
| JP | 2012207483 | A | | 10/2012 | |
| KR | 20200129749 | A | * | 11/2020 | |
| WO | 2017034162 | A1 | | 3/2017 | |

* cited by examiner

TOP-DOWN CONSTRUCTION-TYPE ASSEMBLY CONSTRUCTION METHOD FOR PAVED ROAD SURFACE

CROSS-REFERENCE TO RELATED APPLICATIONS

The present disclosure is a continuation-application of International (PCT) Patent Application No. PCT/CN2024/074963, filed on Jan. 31, 2024, which claims priority of Chinese Patent Application No. 202311113837.2, filed on Aug. 31, 2023, the entire contents of which are hereby incorporated by reference in their entirety.

TECHNICAL FIELD

The present disclosure relates to the technical field of rock burst monitoring, and in particular to a top-down construction type assembly construction method for paved road surface.

BACKGROUND

The low adhesion coefficient road surface of the automobile testing ground is a road surface which is used for testing the steering force control and the stable control of automobile, and the most representative roads are the basalt brick road and the tile brick road, which belong to the paved road surface. Due to these road surfaces are withstood the significant impact load, such as high-speed vehicle, emergency braking, sudden steering and uncontrolled rotation, the evenness and the durability of these road surfaces is greatly tested.

The Chinese patent CN108582414A discloses a buckle mold and prefabricating construction method for road surface prefabricating block. The prefabricating pedestal is poured with the concrete, the steel slabs are laid on the surface of the pedestal, the side mold is supported around the steel slabs, and the prefabricating blocks are prepared inside the side mold, the prefabricating blocks include the tile brick/the basalt brick, the concrete and the steel cage. After the preparation of the prefabricating slabs is completed, it is sufficient to directly flip the prefabricating blocks to the position where the surface of the paved tile brick/the basalt brick is up, and is paved on the road surface. In this disclosure, firstly the steel slabs are leveled before laying the bricks on the mold, and then the prefabricating blocks are made on the leveled steel slabs, finally, the prefabricating blocks are directly laid on the road surface of the roadbed. However, due to the unevenness or inclination of the roadbed and road surface, it may cause poor evenness of the road surface after direct laying, which may result in uneven water film on the road surface with a low adhesion coefficient during the testing, thus affecting the accuracy of the experimental data.

SUMMARY

It is an object of the present disclosure to provide a top-down construction type assembly construction method for paved road surface to solve and alleviate the above-mentioned problems in the prior art.

In order to achieve the above-mentioned object, the present disclosure provides the following technical solutions:

a top-down construction type assembly construction method for paved road surface, wherein, including the following steps I-II:

in the step I, manufacturing prefabricating slabs: using a top-down method to manufacture the prefabricating slabs, and providing threaded sleeves that are configured to vertically penetrate, inside the prefabricating slabs, which are evenly arranged in the prefabricating slabs; and in the step II, mounting the prefabricating slabs: on a lower bearing plate which is clean, placing the prefabricating slabs in one step according to a mounting sequence of a mounting section, then performing a fine tuning on a position and an elevation of the prefabricating slabs, and after the fine tuning is completed, performing a grouting construction, and finally forming the paved road surface which is complete; wherein a step of the fine tuning for the position and the elevation of the prefabricating slabs includes: an altitude coarse tuning, a position fine tuning, a position fine tuning, and an altitude fine tuning;

in the altitude coarse tuning, screwing a leveling bolt, where a lower end of the leveling bolt is contacted with a concrete surface of the lower bearing plate, into the threaded sleeves of each of the prefabricating slabs, and lifting the prefabricating slabs by screwing the leveling bolt until a slab surface altitude of the prefabricating slabs is in accordance with a hanging line altitude of the prefabricating slabs;

in the position fine tuning, lifting the prefabricating slabs a certain distance through a lifting equipment, manually pushing the prefabricating slabs to a desired distance, and slowly lowering the prefabricating slabs;

in the altitude fine tuning, measuring altitudes at four corner points of the prefabricating slabs one by one through an electronic level, after measuring all points and calculating adjustment values, planing an adjustment sequence uniformly through an adjustment principle which is a balancing adjustment, and screwing the leveling bolt according to a planing sequence;

in the step I, manufacturing the prefabricating slabs on a super flat prefabricating pedestal, firstly, mounting and fixing a side mold, and reversely buckling a brick on the super flat prefabricating pedestal inside the side mold, arranging the brick on the super flat prefabricating pedestal which has already laid a demolding barrier layer, and filling brick joint through caulking strip; mounting a first reserving hole mold after completing a reverse laying of the brick, then laying one layer with 8 mm~10 mm thick of a polymer dry mix mortar on a back of the brick, after a final set of the polymer dry mix mortar, mounting a first reinforcing mesh sheet, a second reserving hole mold, a second reinforcing mesh sheet and a pre-embedding steel slab, fixing the threaded sleeves on the pre-embedding steel slab, and opening a grouting hole on the pre-embedding steel slab; after completing above steps, pouring a concrete to finally form one complete piece of the prefabricating slabs; after a concrete strength is reached 75% of a design strength, cooperating with a crane to flip the side mold at a sand pile, checking an evenness and a specification dimension of a brick surface of the prefabricating slabs, and promptly digging out the caulking strip for the prefabricating slabs which is qualified and pointing the joints, and then numbering and storing the prefabricating slabs;

wherein the second reserving hole mold and the first reserving hole mold are mounted at a position corresponding to the threaded sleeves, when pouring the concrete inside the side mold, the second reserving hole mold and the first reserving hole mold are not poured inside, and a position corresponding to the first reserving hole mold is not paved with the brick as a leveling and grouting reserving hole.

Advantageous Effects

The prefabricating slabs of the present disclosure are manufactured by means of firstly laying bricks and then pouring concrete, and finally the prefabricating slabs are rolled over and mounted, thus eliminating on-site concrete bonding between the bricks and the lower bearing plate, improving the overall stability of the bricks and the prefabricating slabs after being mounted, and greatly reducing the separation of the bricks from the road during operation;

the present disclosure is based on the principle of "small block paving is changed to large block paving", which changes the assembly mounting of the paved road surface from "small block" paving to "large block". At the same time, a specially designed pre-embedding structure combined with manual operation is used for achieving the high-precision paving of the prefabricating slabs which have paved the brick, so as to ensure the stability of the overall paved road surface and the high precision of evenness.

LABELS AND DESCRIPTIONS

1—side mold; 2—lower bearing plate; 3—threaded sleeve; 4—grouting hole; 5—first reinforcing mesh sheet; 6—second reinforcing mesh sheet; 7—lift hole pre-embedding piece; 8—connecting reinforcement; 9—caulking strip; 10—pre-embedding steel slab; 11—brick; 12—leveling and grouting reserving hole; 13—leveling bolt; 14—second reserving hole mold.

DETAILED DESCRIPTION OF THE EMBODIMENTS

A top-down construction type assembly construction method for paved road surface includes the following steps I-II:

- in the step I, manufacturing prefabricating slabs: mainly including: designing and dividing the prefabricating slabs, the preparation before pouring the prefabricating slabs, pouring and curing the prefabricating slabs, and the transition of the prefabricating slabs; using a top-down method to manufacture the prefabricating slabs, and providing threaded sleeves 3 that are used to vertically penetrate, inside the prefabricating slabs, which are evenly arranged in the prefabricating slabs; and
- in the step II, mounting the prefabricating slabs: on a lower bearing plate 2 which is clean, placing the prefabricating slabs in one step according to a mounting sequence of a mounting section, then performing a fine tuning on a position and an elevation of the prefabricating slabs, and after the fine tuning is completed, performing a grouting construction, and finally forming the paved road surface which is complete.

The basis for dividing the plane dimensions of the designing and dividing the prefabricating slabs is designing the width and length of the lane, designing the arrangement of expansion joints in the direction of the lane length, and designing the width of the brick joint; the principle of dividing is to arrange the integer bricks exactly in the vertical and horizontal directions of the prefabricating slabs; the vast majority of the prefabricating slabs have the same size, and the end head of the lane or a small part of one side of the lane are adjustment slabs with different sizes; the width of gap between the prefabricating slabs are the same as that of brick joint, and the expansion joint is left according to the designed width of the expansion joint; the lifting capacity and the lifting stability are balanced, the length and width of prefabricating slabs are generally not more than 3 m, and the thickness (including the thickness of brick 11) is controlled at about 25 cm; the division limit value of prefabricating slabs not only considers the lifting capacity and the lifting stability, but also takes into account the fact that the prefabricating slabs are too large to bear self-weight load, which may cause warping, deformation, or even fracture during lifting and storage; but the size of the prefabricating slabs cannot be too small, which will lead to too many slab joints, and is not conducive to installation flatness control and effectively shorten the construction cycle.

Figure 1:
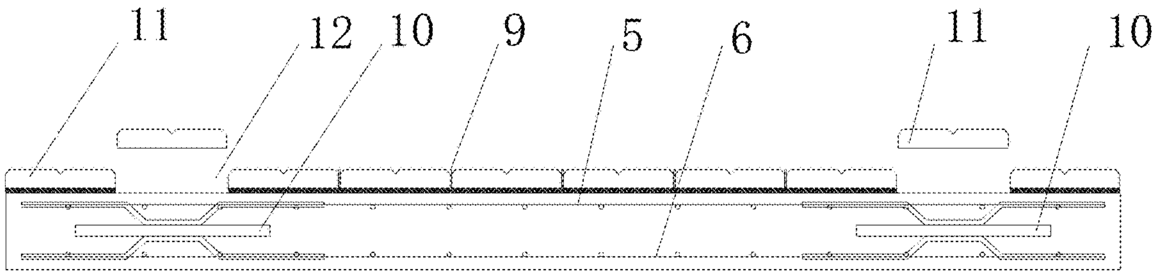
FIG. 1 is a first design schematic diagram of a prefabricating slab according to an embodiment of the present disclosure.
Figure 2:
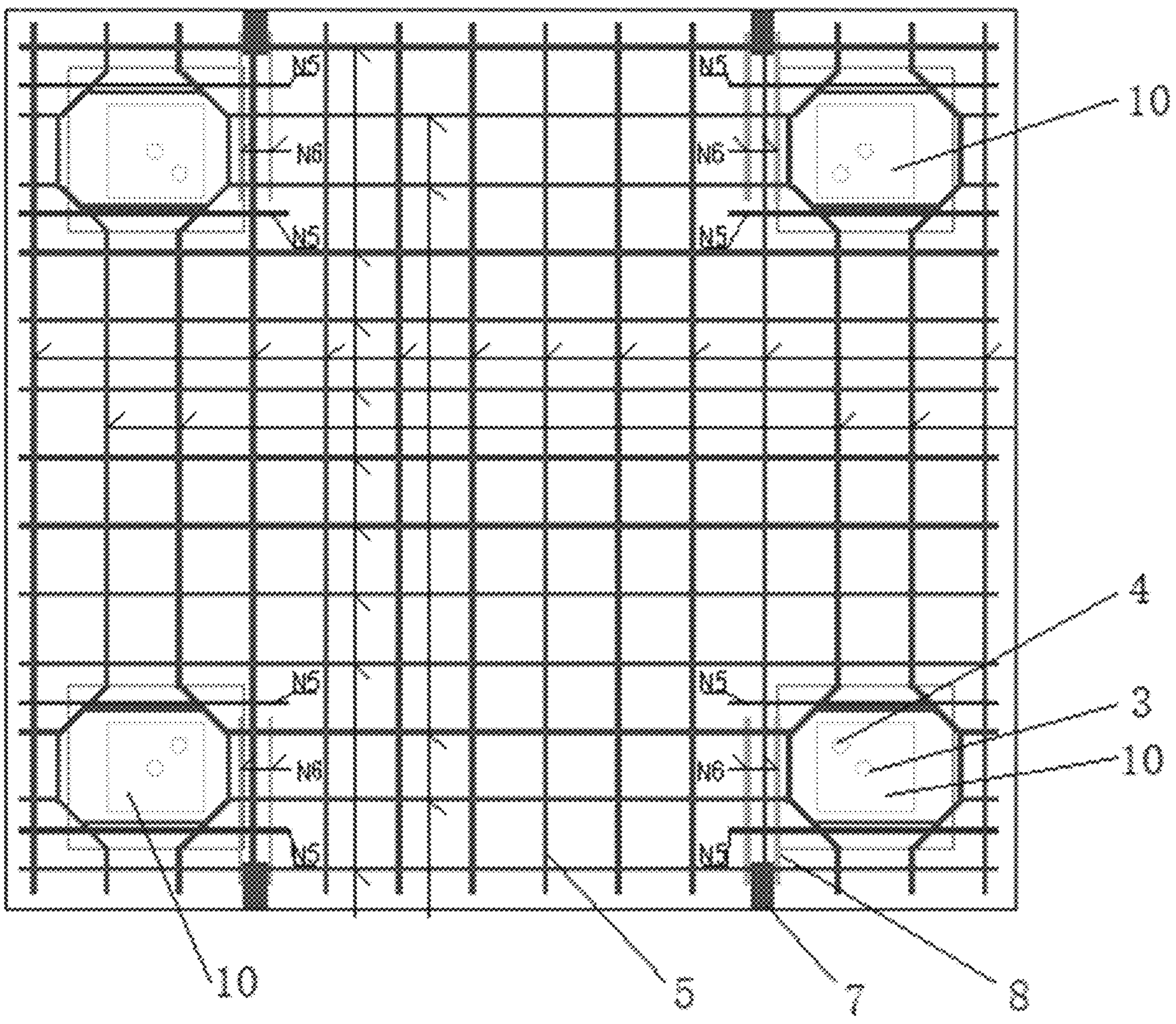
FIG. 2 is a second design schematic diagram of the prefabricating slab according to an embodiment of the present disclosure.

In the process of production and mounting of the prefabricating slabs, the prefabricating slabs should be flipped, and the reinforcement inside the prefabricating slabs should be designed in a bidirectional double-layer manner; the grouting hole 4 and the lift hole pre-embedding pieces 7 need to be placed between two layers of reinforcing mesh sheets, and be firmly welded with the reinforcing mesh sheets; the concrete strength grade is above C30 (the specific reinforcement and concrete strength can be calculated and designed according to actual situations); the grouting hole 4 is reserved at the four corners of the prefabricating slabs, with a distance of 1-2 bricks from an edge of the prefabricating slabs; the lift hole is provided on a pair of longer sides to reduce the bending moment in the middle of the prefabricating slabs during lifting, two lift holes are provided on each side, the lift holes are provided at a position 0.21 times an edge length from an end head to reduce the bending moment in the middle of the prefabricating slabs during lifting; the design examples of prefabricating slabs are shown in FIG. 1 and FIG. 2; based on the design of lane width, length, brick joint width and the like, and based on the principle that the prefabricating slabs are composed of integer bricks arranged in the vertical and horizontal direction, the dimensions of the prefabricating slabs are uniform, the lifting capacity and stability and the like, the length and width of prefabricating slabs should be ≤3 m, and the thickness should be about 25 cm; the block area of the prefabricating slabs in the present disclosure should not only meet the economic of brick 11, but also ensure the overall strength of the prefabricating slabs in the structural design thereof, and prevent deformation during storage, flipping, transportation, mounting and the like.

For a low adhesion coefficient road surface test lane with a length of 200.895 m and a width of 4.915 m, the dimension (size) of prefabricating slabs is 2455 mm*2045 mm, the dimension of the brick 11 is 200 mm*200 mm, and the brick joint is 5 mm; the prefabricating slabs have a total thickness of 200 mm, which include 32 mm thick basalt bricks, 8 mm thick polymer dry mortar, and 160 mm thick C35 reinforcing concrete slab; the dimension of pre-embedding steel slab 10 is 360 mm*360 mm*20 mm.

The preparation before pouring of the prefabricating slabs mainly includes three steps: processing and mounting the side mold 1, reversely buckling and arranging the brick, mounting the reinforcing mesh sheet and pre-embedding piece; specifically, it may include processing the side mold 1, assembling the side mold 1, reversely buckling and arranging the brick, filling the brick joint strips, laying the polymer dry mix mortar on the back of the brick, mounting the reinforcing mesh sheet and pre-embedding piece, as well as the reserving hole mold upper the grouting hole 4, pouring and curing the concrete, demolding the prefabricating slabs, flipping, jointing, storing and the like.

Processing and mounting the side mold 1: the design principle of the side mold 1 is that, it must have sufficient rigidity to prevent deformation during flipping process, which may cause the four sides of prefabricating slabs to protrude, so that the adjustment space of the gaps of prefabricating slabs is reduced, which even make mounting impossible; after assembly, the side mold 1 must ensure a relatively perfect rectangular shape to avoid diagonal distortion.

The production of side mold 1 adopts four thick walled square steels to ensure sufficient rigidity, and steel slab is provided at the end joint to limit the position, so as to forcibly form a 90 degree angle after connecting to the formwork; the release agent is applied before assembly, the length and width dimensions, center width and diagonal length of the formwork, and the straightness of the formwork after assembly are checked, with an error of ≤1 mm, so as to ensure that the dimensional accuracy after assembly meets the design requirements; a side of the side mold 1 is provided with lift holes, and the lift holes are provided at a position 0.21 times an edge length from an end head, with two lift holes provided on each side of an outer side surface of the side mold.

Manufacturing the prefabricating slabs on a super flat prefabricating pedestal, firstly, mounting and fixing a side mold 1, and reversely buckling a brick 11 on the super flat prefabricating pedestal inside the side mold 1, arranging the brick 11 on the super flat prefabricating pedestal which has already laid a demolding barrier layer, and filling brick joints through the caulking strip 9; mounting a first reserving hole mold after completing a reverse laying of the brick 11, then laying one layer with 8 mm~10 mm thick of a polymer dry mix mortar on a back of the brick 11, after a final set of the polymer dry mix mortar, mounting a first reinforcing mesh sheet 5, a second reserving hole mold 14, a second reinforcing mesh sheet 6 and a pre-embedding steel slab 10, fixing the threaded sleeves 3 on the pre-embedding steel slab 10, and opening a grouting hole 4 on the pre-embedding steel slab 10; after completing above steps, pouring a concrete to finally form one complete piece of the prefabricating slabs; after a concrete strength is reached 75% of a design strength, cooperating with a crane to flip the side mold 1 at a sand pile, checking an evenness and a specification dimension of a brick surface of the prefabricating slabs, and promptly digging out the caulking strip 9 for the prefabricating slabs which is qualified, and then numbering and storing the prefabricating slabs; the second reserving hole mold 14 and the first reserving hole mold are mounted at a position corresponding to the threaded sleeves 3, when pouring the concrete inside the side mold 1, the second reserving hole mold 14 and the first reserving hole mold are not poured inside, and a position corresponding to the first reserving hole mold is not paved with the brick 11 as a leveling and grouting reserving hole 12.

The side mold 1 is mounted on the super flat prefabricating pedestal, and after laying the pedestal demolding barrier layer plastic film, the side mold 1 is assembled on the barrier; during the flipping process, the side mold 1 should be handled gently and placed on the ground to prevent collision and overhead placement and avoid deformation; the release agent is coated in advance before each assembly, so as to prevent the coating release agent from contaminating the brick surface, brick back and the like on the inner side of the formwork after assembly, which may affect the bonding strength of the materials; after each demolding, the concrete paste adhered on the surface of formwork is timely cleaned, a steel wire brush is used for cleaning, while do not use the hammer to strike to clean; after each assembly, the length and width dimensions, as well as the width of the center of the formwork in the longitudinal and transverse directions, the length of the two diagonals, and the straightness of the formwork are checked; if any deformation is found, the formwork should be sent back to the manufacturer for mechanical correction in a timely manner, and the large hammer should not be used for correction in the field, and if the correction cannot be made, a new formwork should be replenished according to the construction progress to prevent the excessive influence of the deformation of the prefabricating slabs.

Reversely buckling and arranging the brick: after the side mold 1 is assembled and inspected to be qualified, reversely buckling and arranging the brick is started, and before placing the brick, it is checked that whether the barrier layer plastic film is disturbed during the placement of the side mold 1, and whether there are wrinkles and bubbles, and if yes, the side mold 1 is slightly lifted to support and level the barrier layer plastic film; the brick is placed into the side mold 1 according to the designed arrangement, with the brick face facing downwards, and the brick joint is temporarily vertically inserted with the caulking strip 9 to control the width of the brick joint; before putting in, it is confirmed that there is no impurity or dust on the pedestal surface and the brick surface in the mold, otherwise, it shall be cleaned thoroughly; the caulking strip 9 uses a manual wood strip, and can be made into a required size, the width is same as the width of a designed brick joint, and the height thereof is determined according to the condition of the rounded corners of the brick surface; after all the bricks 11 are arranged, a joint-embedding wood strip is embedded in the whole length of the brick joint, and the wood strip is embedded in the bottom to be in contact with the top surface of the pedestal; the brick 11 is gently tapped with a rubber hammer to confirm that each brick is laid in place and the brick face is tightly attached to the pedestal surface; afterwards, the brick 11 at leveling and grouting reserving hole 12 is taken out, the first reserving hole mold is embedded into the space of the brick 11, the reserving hole is a square hole, the affected brick 11 and the first reserving hole mold is lightly tapped with a rubber hammer, so that the brick face and the first reserving hole mold is abutted against the pedestal face; a little water is sprinkled on the back face of the brick to wet, and the sprinkling cannot be excessive, so as to prevent water from accumulating; then one layer with 8 mm~10 mm thick of a dry mix mortar is laid on a back of the brick, and after scraping flat, a washboard is rubbed; the mortar is mixed with water according to the amount of water used in the product description and stirred uniformly; after the brick-backed dry mix mortar is completely final set, the mounting operation of the reinforcing mesh sheet can be performed.

Figure 3:
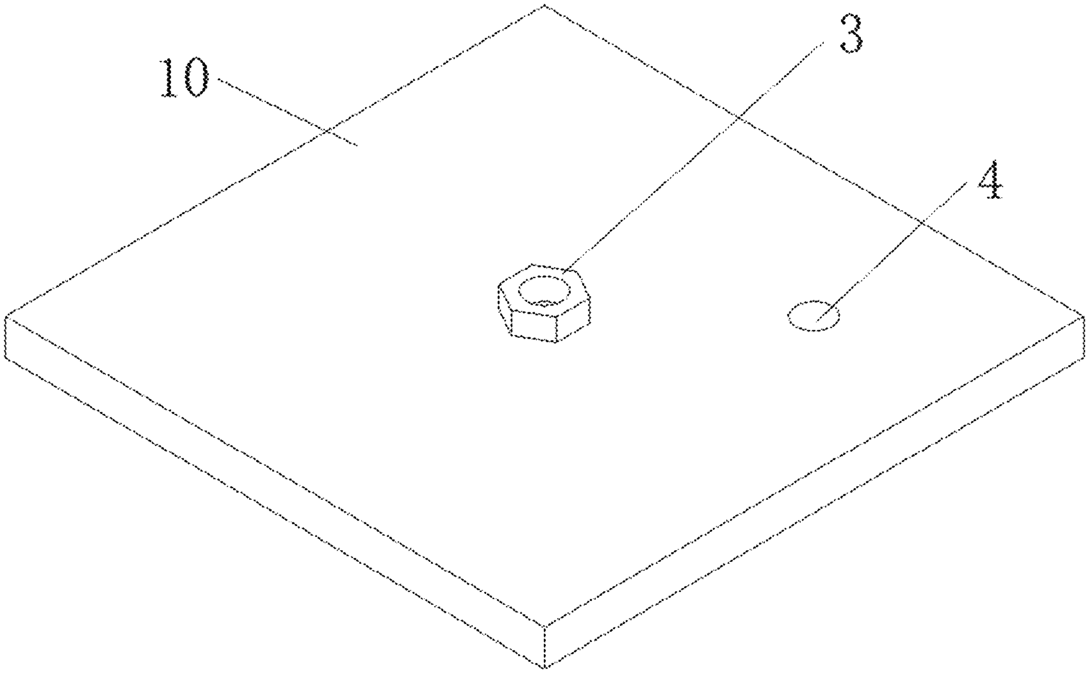
FIG. 3 is a structure schematic diagram of a pre-embedding steel slab according to an embodiment of the present disclosure.

Mounting the reinforcing mesh sheet and pre-embedding piece: the first reinforcing mesh sheet 5 and the second reinforcing mesh sheet 6 are processed and bound in the processing shed, if there is a conflict between the steel reinforcement and the position of reserving hole, the position of steel reinforcement is adjusted, after the brick back dry mixed mortar has fully set, the reinforcing mesh sheet is placed into the mold; a concrete cushion block is placed on the first reinforcing mesh sheet 5 to pad a concrete lower protection layer with a thickness of 2±0.2 cm; the second reinforcing mesh sheet 6 is supported on the first reinforcing mesh sheet 5 through a horse stool, and a concrete upper protection layer is formed with a thickness of 3±0.3 cm on the upper side of the first reinforcing mesh sheet 5; before mounting the second reinforcing mesh sheet 6, a pre-embedding piece is mounted, the pre-embedding piece includes a pre-embedding steel slab 10 and the lift hole pre-embedding pieces corresponding to the lift holes, the pre-embedding steel slab 10 is welded to the first reinforcing mesh sheet 5; afterwards, the second reserving hole mold 14 is placed on the pre-embedding steel slab 10 and finally the second reinforcing mesh sheet 6 is mounted; the lift hole pre-embedding pieces are fixedly connected to the first reinforcing mesh sheet 5 through a connecting reinforcement 8; FIG. 3 is a structure schematic diagram of the pre-embedding steel slab.

Figure 4:
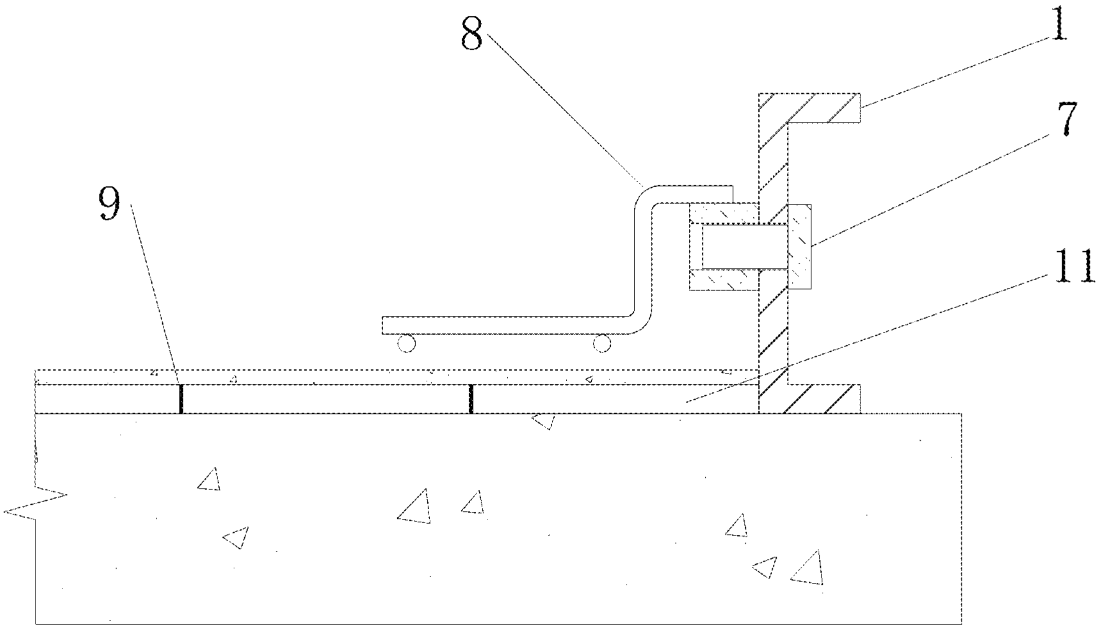
FIG. 4 is a design schematic diagram of a lift hole pre-embedding piece according to an embodiment of the present disclosure.
Figure 5:
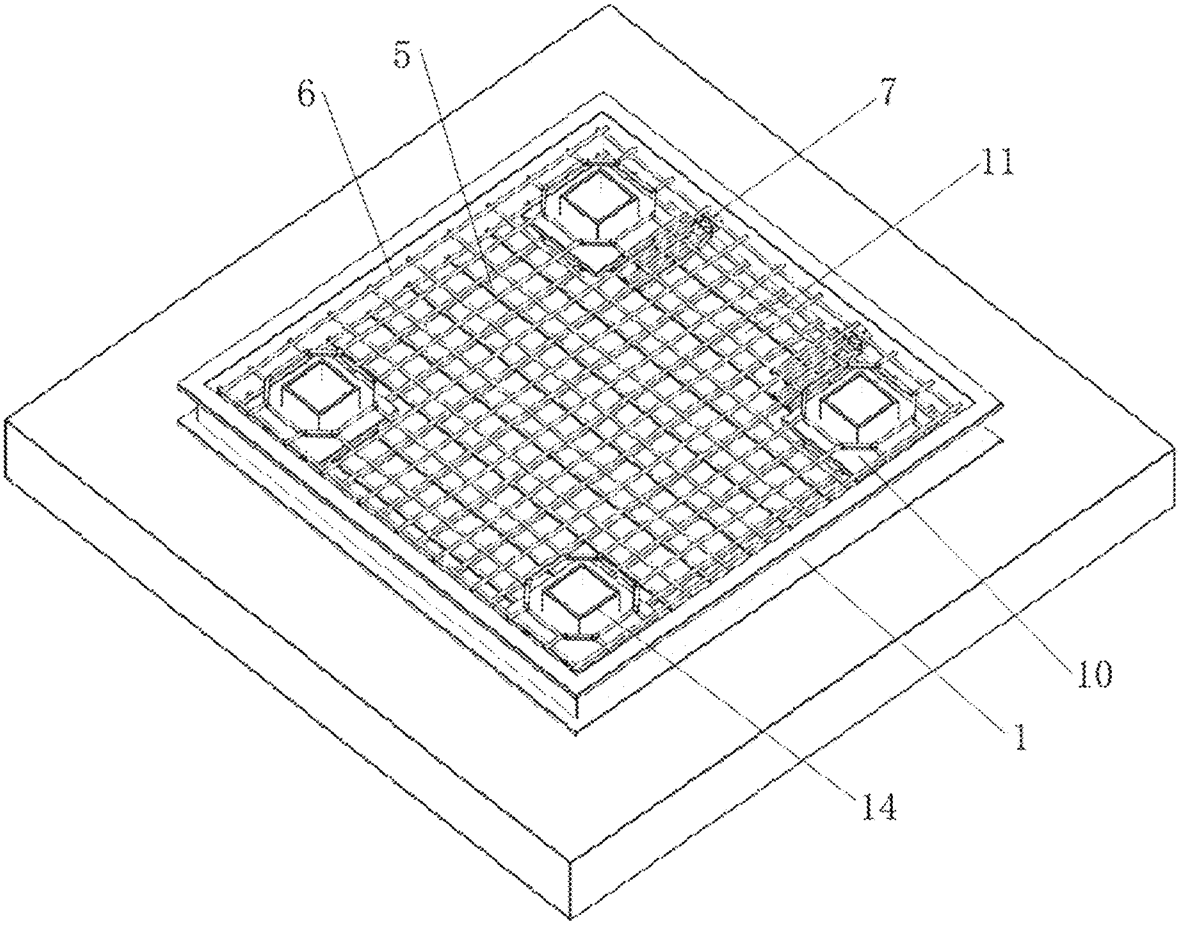
FIG. 5 is a structure schematic diagram of the prefabricating slab before concrete pouring according to an embodiment of the present disclosure.

The lift hole pre-embedding pieces 7 are threaded sleeves, which can be threadedly connected to the screw bolt lifting ears to lift the prefabricating slabs, and each threaded sleeve has inner threads with a diameter of 32 millimeters. When mounting the lift hole pre-embedding pieces 7, the lift hole pre-embedding pieces 7 are aligned with the reserving lift holes and are abutted against the inner wall of the side mold 1, and the M32 screw is screwed into the outside of the formwork and is tightened, so as to ensure a stable mounting of pre-embedding pieces, at the same time, when pouring, the lift hole pre-embedding pieces 7 are prevented from being filled with the concrete slurry; the outer side of lift hole pre-embedding pieces 7 is welded at the position of reserving lift holes, as shown in FIG. 4, the inner side of lift hole pre-embedding pieces 7 is welded together with the connecting reinforcement 8 and the reinforcing mesh sheet, and the position of the reinforcing mesh sheet is also fixed; the threaded sleeves 3 are passed through the center of pre-embedding steel slab 10 and are welded together; each threaded sleeve 3 is a sleeve that has inner threads with a diameter of 32 millimeter, and pass through pre-embedding steel slab 10 and is firmly welded therewith, and the sleeve length is ≥5 cm; the leveling bolt 13 can be screwed into the threaded sleeve 3 for leveling at the mounting site of the prefabricating slabs; the pre-embedding steel slab 10 is further provided with a grouting hole 4 beside the threaded sleeves 3; the pre-embedding steel slab 10 is placed on the first reserving hole mold, and then is fixed together by welding the auxiliary reinforcement and first reinforcing mesh sheet 5; then the second reserving hole mold 14 is placed on the pre-embedding steel slab 10, finally the second reinforcing mesh sheet 6 is mounted, and the second reserving hole mold 14 is fixed via the second reinforcing mesh sheet 6, and the second reserving hole mold 14 is pressed against the pre-embedding steel slab 10 with an iron wire, wherein the cross-sectional dimensions of the first reserving hole mold and the second reserving hole mold 14 are at least 5 cm smaller than those of the pre-embedding steel slab 10, so that at least 5 cm of the first reserving hole mold and the second reserving hole mold 14 are exposed on each side of pre-embedding steel slab 10, which can ensure that after pouring concrete, the pre-embedding steel slab 10 is embedded in the concrete on each side by ≥5 cm; FIG. 1 and FIG. 2 are schematic diagrams of the reinforcing mesh sheet, FIG. 3 is a structure schematic diagram of the pre-embedding steel slab, FIG. 4 and FIG. 5 are structure schematic diagrams of the pre-embedding slab after the completion of the reversely buckling and arranging the brick.

Figure 6:
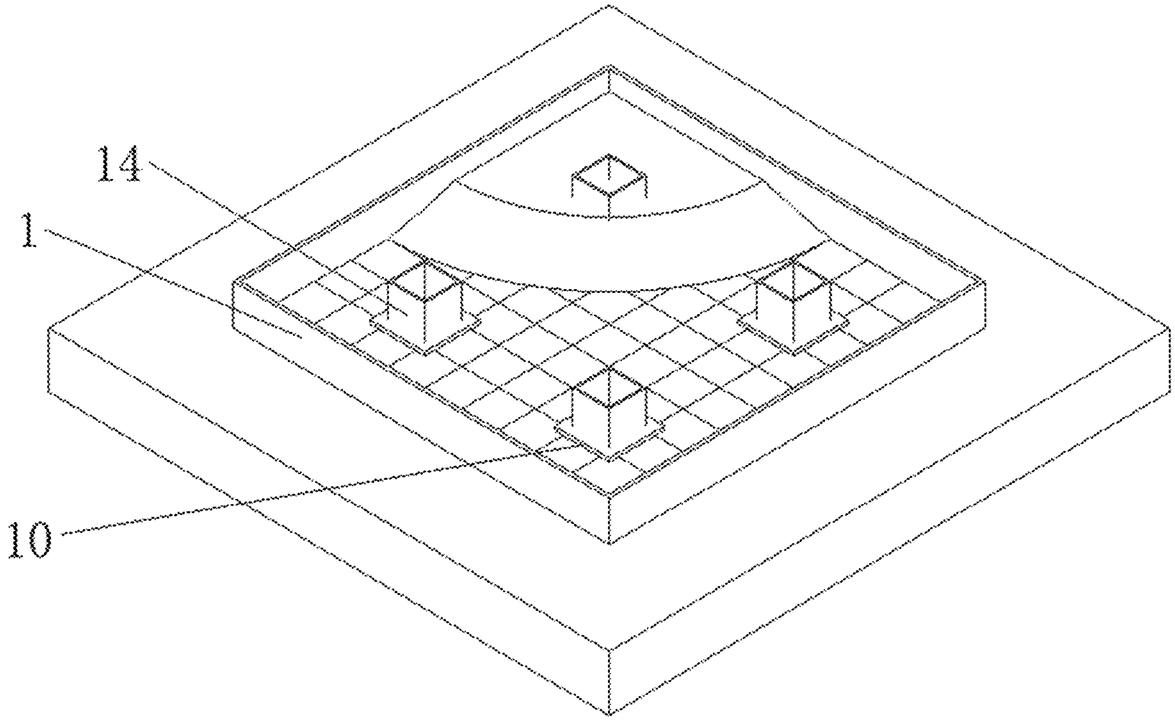
FIG. 6 is a structure schematic diagram of the prefabricating slab during concrete pouring according to an embodiment of the present disclosure.
Figure 7:
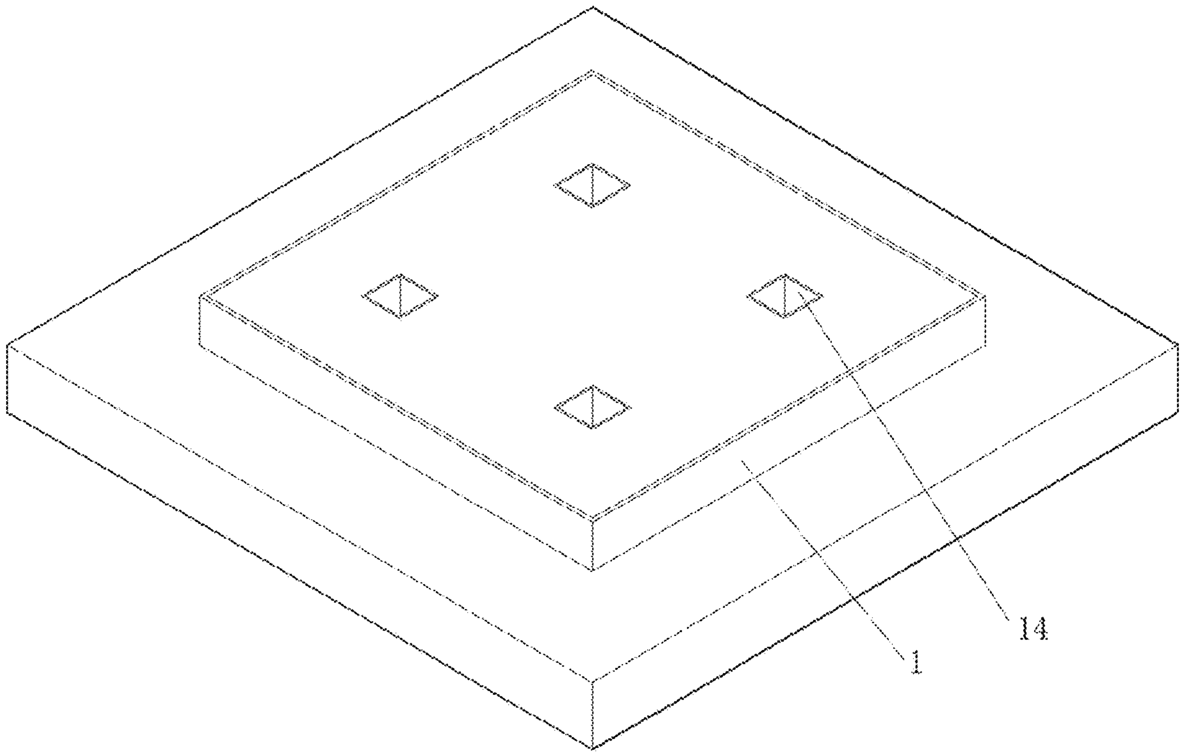
FIG. 7 is a structure schematic diagram of the prefabricating slab after concrete pouring according to an embodiment of the present disclosure.

Pouring and curing the pre-embedding slab includes: sprinkling a small amount of water on the surface of the dry mixed mortar to moisten it before pouring the concrete; the concrete grade meets the design requirements, the slump is controlled at 80-120 mm, and each piece of prefabricating slabs is poured at one step; the concrete shall be manually poured into the formwork, and the concrete shall not be directly put into the formwork from the tanker; the concrete shall be placed on the prepared pad or handcart next to the formwork and manually shoveled into the formwork; a small vibrating rod or flat vibrator to vibrate is used, and do not touch the steel bars, the pre-embedding piece and the bottom dry mixed mortar layer, the vibration should be dense, especially at the position of pre-embedding piece; after the concrete pouring is completed, it should be covered and cured with the plastic film, the geotextile or the insulation materials and the like in a timely manner according to the temperature situation, so as to keep the concrete surface moist and not frozen; prefabricating slabs should be insulated, moisturized, and watered for at least 7 days before removing the pedestal; FIG. 5 is a structure schematic diagram of the pre-embedding steel slab before concrete pouring, FIG. 6 is a structure schematic diagram of the pre-embedding steel slab during concrete pouring, FIG. 7 is a structure schematic diagram of the pre-embedding steel slab after concrete pouring, respectively.

Figure 8:
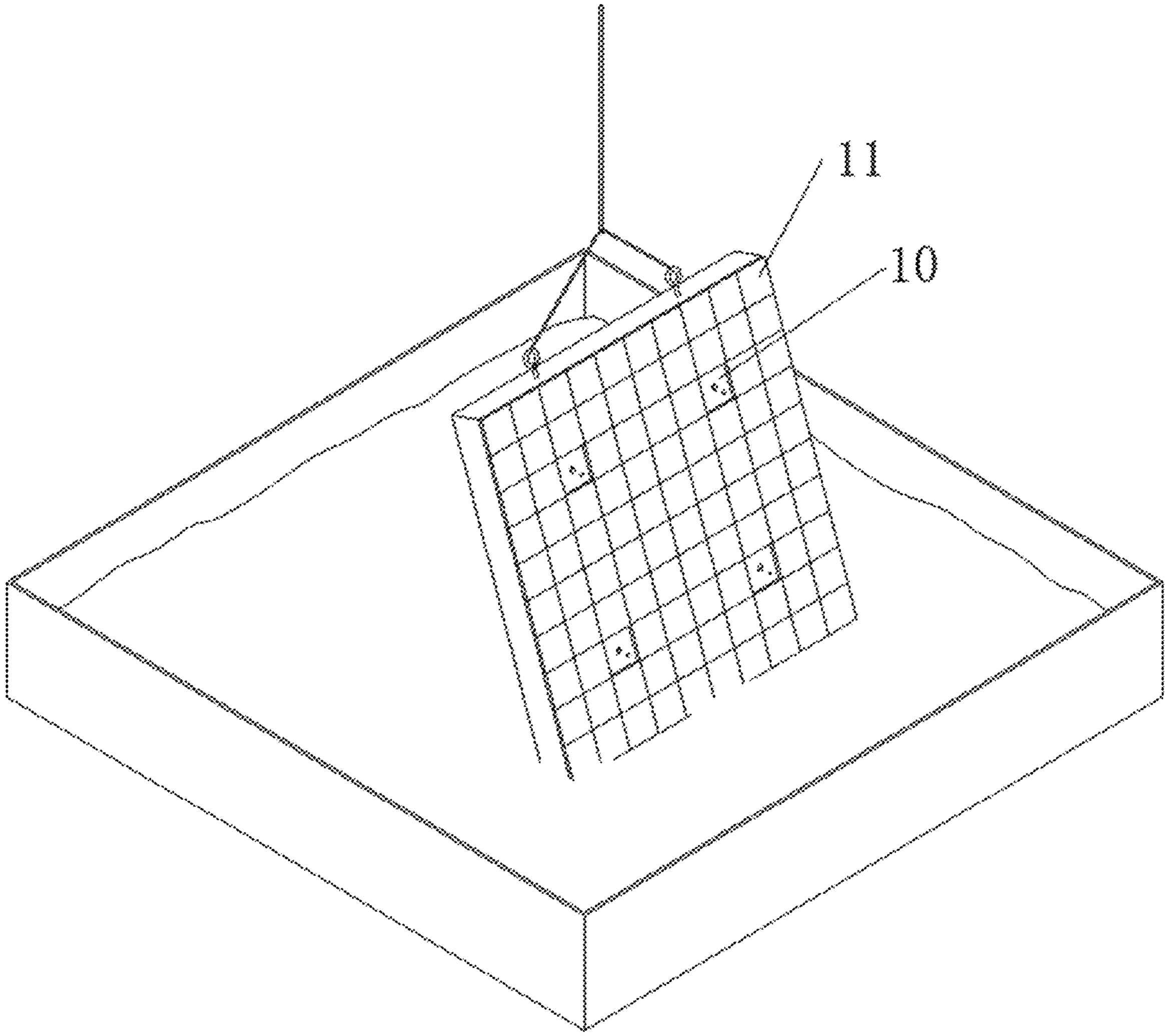
FIG. 8 is a process schematic diagram of the flipping process of the prefabricating slab according to an embodiment of the present disclosure.

The specific steps for the transition of prefabricating slabs are that, when the temperature is above 15° C., generally, after 24 hours of concrete pouring, the side mold 1 (demolding strength ≥2.5 MPa) should be removed. Before demolding, the screw bolt lifting ears, which are used to fix the lift hole pre-embedding pieces 7, should be removed to avoid disturbing the bond between the lift hole pre-embedding pieces 7 and the concrete when removing the screw bolt lifting ears; after removing the side mold 1, the maintain insulation, the moisture and the curing are continued; after a concrete strength is reached 75% of a design strength (at least 7 days of curing), the prefabricating slabs are removed from the pedestal; as shown in FIG. 8, a sand pile is provided next to the prefabricating pedestal as the flipping site of prefabricating slabs, and a crane is manually cooperated with to flip the side mold at a sand pile, and flipping prefabricating slabs on the sand pile is mainly to avoid damage to the brick surface caused by unprotected flipping.

When storing, two-three square wood mats are used to cushion under prefabricating slabs, each stack of prefabricating slabs should not exceed 5 layers, and two-three square wood mats should be placed between layers for isolation; an evenness and a specification dimension of a brick surface of the prefabricating slabs are checked, and the caulking strip 9 for the prefabricating slabs, which is qualified, are promptly digging out and the joint is pointed, the lower prefabricating slabs are stacked upwards after the pointing is completed for 48 h, and FIG. 1 schematically shows a structural schematic diagram of the prefabricating slabs after flipping and when the caulking strip 9 is not digging out; at the same time, it is necessary to number and store the prefabricating slabs, especially distinguishing between different models of prefabricating slabs. It is worth noting that, in the technical field of construction and masonry, "pointing" refers to a process of filling and finishing the joints between bricks, stones, or other building materials. It is typically done to enhance the appearance of the structure, improve weather resistance, and prevent water penetration into the joints, which can lead to deterioration over time. In this embodiment, the process of jointing is used to fill the gap after the caulking strip 9 taking off from the qualified prefabricating slabs.

The mounting of prefabricating slabs mainly includes the following steps: the prefabricating slab layout, the altitude coarse tuning, the position fine tuning, the altitude fine tuning and the grouting; specifically, it can be divided into the construction of lower bearing plate 2, the mounting grouting planning, the prefabricating slab layout, the altitude coarse tuning, the position fine tuning, altitude fine tuning, grouting, arranging the brick at the leveling and grouting reserving hole, and pointing the joints between slabs and the like.

Figure 10:
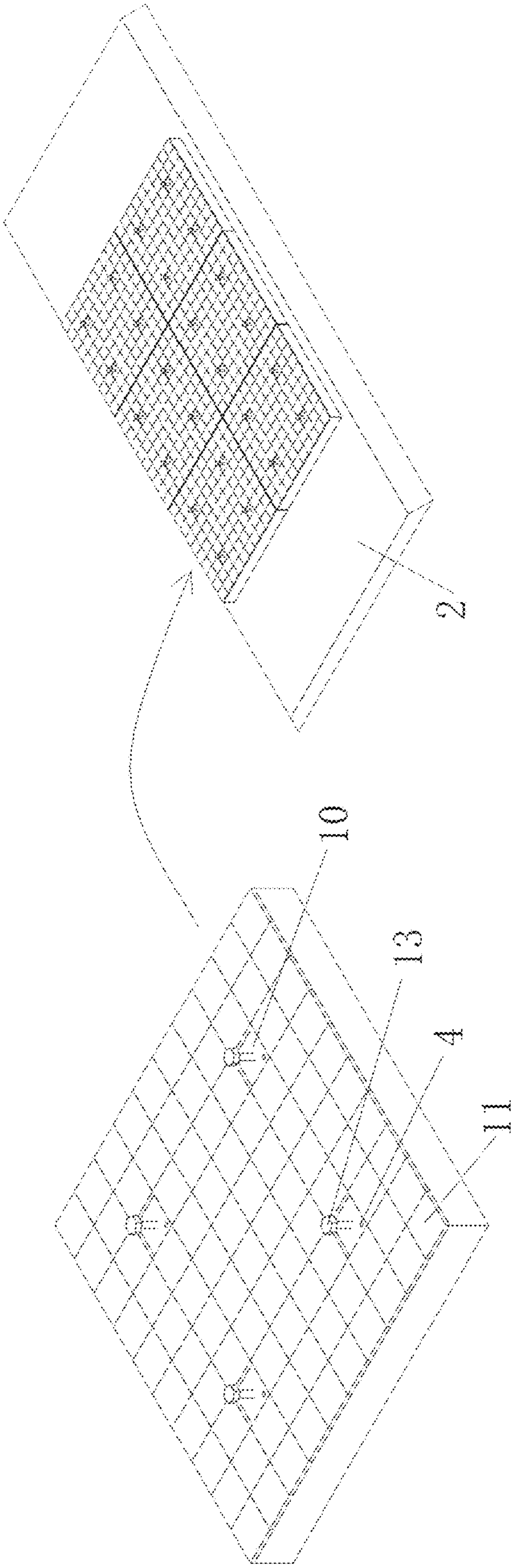
FIG. 10 is a schematic diagram of the assembly mounting process of a "large block" according to an embodiment of the present disclosure.

Prefabricating slab layout: the ink line grid are previously drawn on the concrete surface of the lower bearing plate 2; when placing the prefabricating slabs in one step according to the mounting sequence of the mounting section, the wooden strip with a same width as the slab joint which is configured to make a clamping strip to control the gaps between slabs, when laying the slab, the clamping strip is configured to control the gaps between slabs, the clamping strip is placed against four corners of the prefabricating slabs, and the prefabricating slabs being fallen within the ink line grid is ensured during a laying process. The mounting sequence generally progresses from one end to the other, and the corresponding model prefabricating slabs is transported from the storage site of the prefabricating slabs to the mounting site of the prefabricating slabs, it is recommended to use transport vehicles with accompanying cranes, after the prefabricating slabs are arrived at the mounting site, it is directly lifted onto its mounting position (inside the ink line grid); the position of prefabricating slabs is tried to place as accurately as possible at once to reduce the workload of position fine tuning in the later stage, as shown in FIG. 10, which is a schematic diagram of the assembly mounting process of transforming a "small block" prefabricating slab into a "large block"; when laying the slab, the clamping strip is used to control the gap between the prefabricating slabs to prevent the slabs from colliding with each other during the falling process and causing the brick surface to crack; the clamping strip needs to be placed at the corners of prefabricating slabs; the error of prefabricating slabs corners is generally small, and the middle is protruded outward due to deformation of side mold 1 of the prefabricating slabs, which causes the prefabricating slabs to be too wide and accumulate errors, resulting in prefabricating slabs exceeding the mounting range. Therefore, during the prefabricating slab laying process, it is necessary to check whether the prefabricating slabs can fall within the ink line grid at any time, adjust it timely with problems, and uniformly digest the error, so as to ensure that the length of the final whole lane meets the design requirements.

Figure 9:
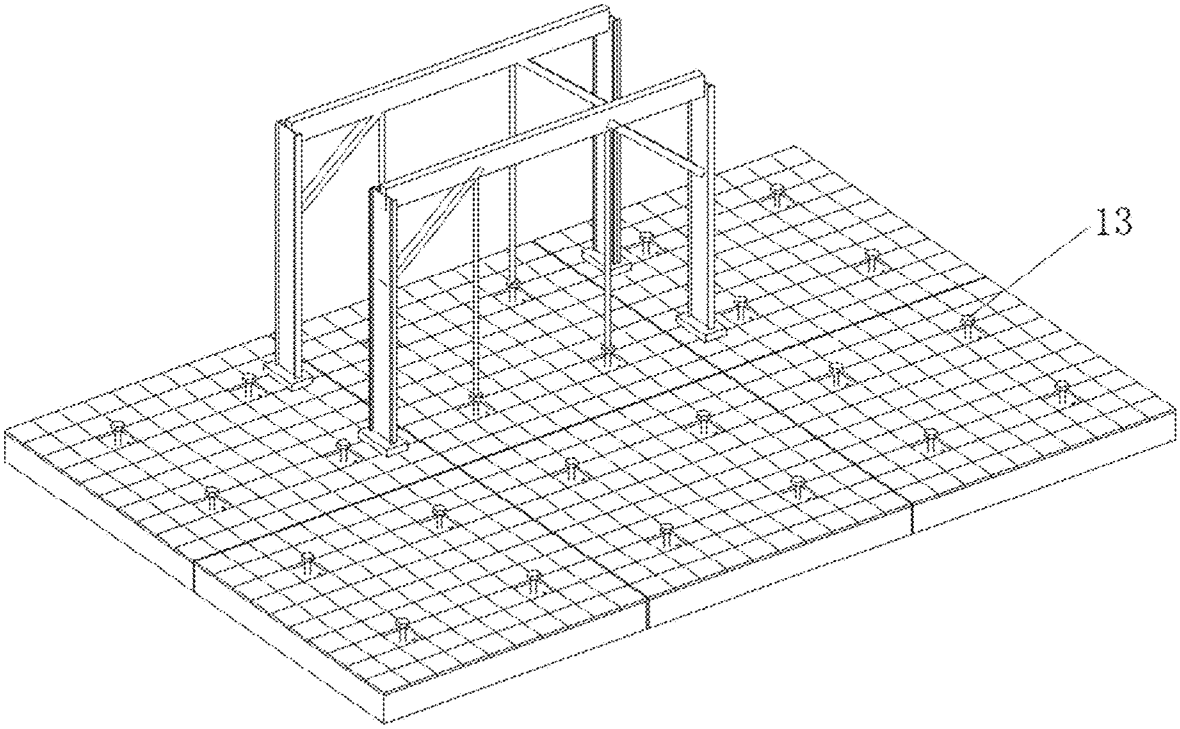
FIG. 9 is a process schematic diagram during a position fine tuning according to an embodiment of the present disclosure.
Figure 11:
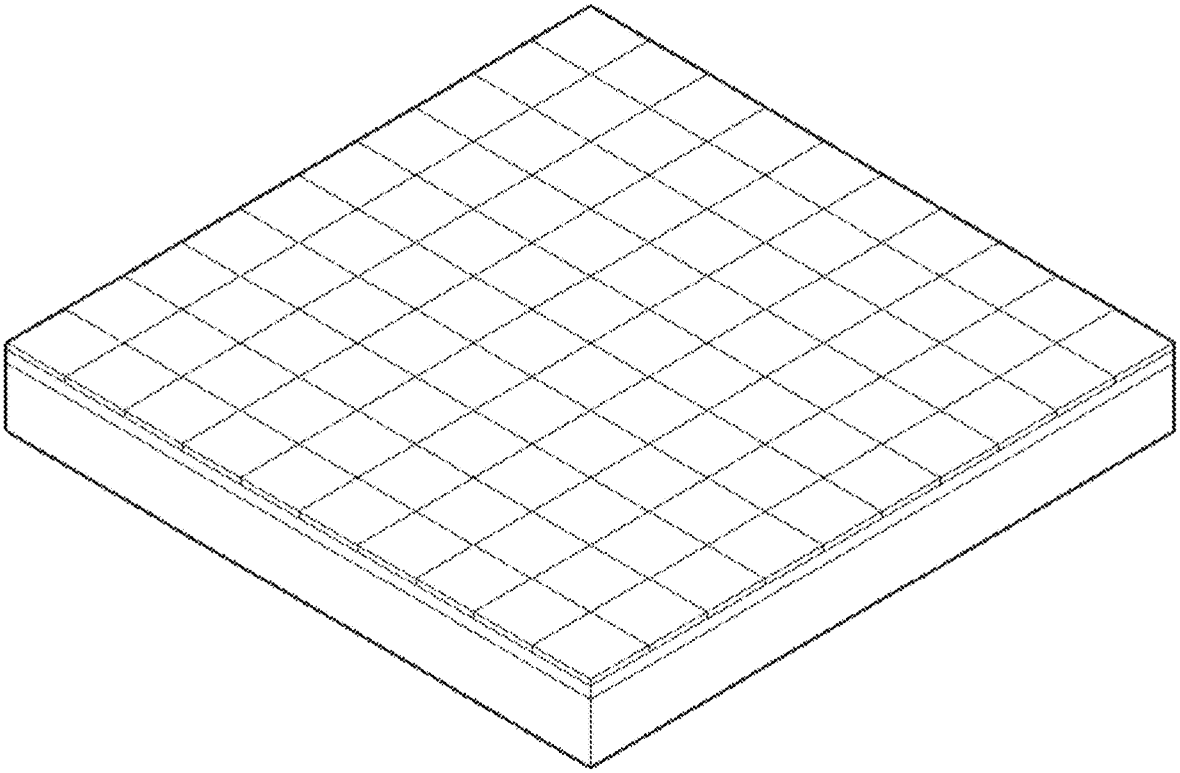
FIG. 11 is a schematic diagram of the prefabricating slab structure after brick subsidy at a leveling and grouting reserving hole according to an embodiment of the present disclosure.

Wherein, the fine tuning steps for the position and altitude of prefabricating slabs are as following:

altitude coarse tuning: in order to reduce the measurement workload of coarse tuning, the coarse tuning uses a layout control pile to level the hanging line or adjust the standard slab altitude at certain intervals, and then the hanging line adjusts the remaining slab altitude; before the coarse tuning, screwing a leveling bolt 13, where a lower end of the leveling bolt 13 is contacted with a concrete surface of the lower bearing plate 2, into the threaded sleeves of each of the prefabricating slabs, and lifting the prefabricating slabs by screwing the leveling bolt 13 until a slab surface altitude of the prefabricating slabs is in accordance with a hanging line altitude of the prefabricating slabs. Due to the large weight of the prefabricating slabs, the screw bolt needs a large torque to rotate after being stiffened, a special T-shaped socket wrench can be added, and a longer rotating handle can be welded to the upper part; each of the prefabricating slabs is provided with four threaded sleeves 3; at the altitude coarse tuning, the leveling bolt 13 is simultaneously rotated in one direction by two workers, four screw bolts of one same prefabricating slab are adjusted slowly and evenly, one of the screw bolts is rotated up to 1-2 turns, and then a next one of screw bolts is rotated, and a cycle is repeated until the slab surface altitude of the prefabricating slabs is consistent with the hanging line altitude of the prefabricating slabs; if the adjustment height of a single screw bolt is too large, it will cause the prefabricating slabs to tilt and shift, and even squeeze the adjacent prefabricating slabs, resulting in position deviating from its original position, and the vertical and horizontal prefabricating slabs are not aligned;

position fine tuning: after a slow equilibrium uplift of prefabricating slabs, after the altitude coarse tuning, the position of the slab will still undergo slight displacement, and the fine tuning is required for the position; as shown in FIG. 9, lifting the prefabricating slabs a certain distance through a lifting equipment, manually pushing the prefabricating slabs to a desired distance, and slowly lowering the prefabricating slabs, it is strictly prohibited to use a pry bar to pry and move the prefabricating block next to it, as this will damage the brick surface of prefabricating slabs; as shown in FIG. 9, a simple hanger can be used in conjunction with a lifting hoist, the nut head of leveling bolt 13 is used as the lifting point, the prefabricating slabs can be lifted a small distance until the tip of the leveling bolt 13 disengages from the lower bearing plate 2 and no longer exerts force. Then, the prefabricating slabs are manually pushed to the desired position by using the leveling and grouting reserving hole as the force point, then it is stabilized, and the prefabricating slabs ares slowly lowered; the position adjustment should take into account the large surface, and the method of hanging line should be adopted to make the vertical and horizontal slab joints straight and even, and the prefabricating slabs are arranged neatly.

altitude fine tuning: after completing the position fine tuning, the final altitude fine tuning is performed by using the electronic level to measure altitudes at four corner points of the prefabricating slabs one by one through an electronic level, and calculate the difference between them and the design value; it is not possible to measure one point and adjust one point at a time, after measuring all points and calculating adjustment values, planing an adjustment sequence uniformly through an adjustment principle which is a balancing adjustment, and screwing the leveling bolt 13 according to a planing sequence, it is not allowed to adjust the height of one screw bolt too much at a time, as this will cause the slab to shift; at the altitude fine tuning, each of screw bolts is adjusted half-turn, and then the next one of screw bolts is adjusted, and the cycle is repeated; after adjustment, each of screw bolts being in effective contact with a surface of the lower bearing plate 2 is ensured, and a shaking of the prefabricating slabs is not performed; when adjusting the altitude, a ruler is configured for checking the evenness between the ruler and surrounding prefabricating slabs, which meet an evenness requirement specified in a design, when the evenness deviation is large, it should be first checked whether the elevation of the slabs and its surrounding slabs are changed due to touch during the adjustment process, as long as the altitude is accurate, there will be no large deviation in flatness in general, and small deviations in flatness can be eliminated by considering the altitude fine tuning;

grouting and completion: after one fine tuning mounting section is completed, the grouting construction is timely performed; before the grouting construction, a compression air is configured for blowing and leveling dust and impurities in the leveling space through the grouting hole 4 to ensure that the grouting hole 4 and the void area are unobstructed and dust-free; the grouting hole 4 is reserved at the four corners of the prefabricating slabs, with a distance of 1-2 bricks from an edge of the prefabricating slabs; a diameter q of the grouting hole 4 is 20 mm; before the grouting construction, an inter-space and the slab joint between the surrounding prefabricating slabs and the lower bearing plate 2 are sealed with a high-grade cement mortar to prevent the grout from flowing out of the grouting area; the preferred grouting material is high strength, good fluidity, no bleeding, no layering, good durability, early strength, and slightly expanded concrete prestressed pore grout; then the grouting construction is started to fill a leveling space between the prefabricating slabs and the surface of the lower bearing plate 2, as well as the gaps between slabs of adjacent prefabricating slabs, so as to make it dense and pore free; in order to prevent the panel uplift during the grouting construction, an electronic level is used for monitoring whether the prefabricating slabs are raised in real-time during the grouting construction, and the elevation and the evenness of all prefabricating slabs are immediately checked after the grouting construction is completed, and the elevation and the evenness of all prefabricating slabs are adjusted in a timely manner before slurry solidifies; after the grouting construction is completed, the brick 11 at the leveling and grouting reserving hole 12 is subsidized to jointing a slab block; after the slab block is jointed, a road surface is cleaned and the road surface of the slab block of the prefabricating slabs is mounted; FIG. 11 is a structure schematic diagram of the prefabricating slab after subsidizing the brick 11.

The present disclosure uses a top-down method to produce the prefabricating slabs, which ensures the durability and evenness of the brick surface on the prefabricating slabs; during mounting the prefabricating slabs, the high-precision mounting of prefabricating slabs is achieved through the initial positioning of the position, the altitude coarse tuning, the position fine tuning, and the altitude fine tuning, which ensures the stability of the overall road surface and the high precision of the evenness. Compared with the manual on-site laying, the engineering cost is saved, and the construction period is shortened.

What is claimed is:

1. A top-down construction type assembly construction method for paved road surface, comprising:

step I, using a top-down method to manufacture prefabricating slabs, and providing threaded sleeves configured to vertically penetrate the prefabricating slabs, wherein the threaded sleeves are evenly arranged in the prefabricating slabs; and step II, mounting the prefabricating slabs on a lower bearing plate which is clean, placing the prefabricating slabs in one step according to a mounting sequence of a mounting section, then performing a tuning on a position and an altitude of the prefabricating slabs, and after the tuning is completed, performing a grouting construction, and finally forming the paved road surface which is complete; wherein a step of the tuning on the position and the altitude of the prefabricating slabs comprises: an altitude coarse tuning, a position fine tuning, and an altitude fine tuning; and in the altitude coarse tuning, screwing leveling bolts into the threaded sleeves of each of the prefabricating slabs respectively, a lower end of each of the leveling bolts contacts a concrete surface of the lower bearing plate, and lifting the prefabricating slabs by screwing the leveling bolts until an altitude of a slab surface of the prefabricating slabs is in accordance with an altitude of a string line of the prefabricating slabs; and in the position fine tuning, lifting the prefabricating slabs a certain distance through a lifting equipment, manually pushing the prefabricating slabs to a desired distance, and slowly lowering the prefabricating slabs; and in the altitude fine tuning, measuring altitudes at four corner points of the prefabricating slabs one by one through an electronic level, after measuring all points and calculating adjustment values, planning an adjustment sequence, evenly adjusting the altitudes, and screwing the leveling bolts according to the sequence; and in step I, manufacturing the prefabricating slabs on a super flat prefabricating pedestal, firstly mounting and fixing a side mold, and inverting bricks on the super flat prefabricating pedestal inside the side mold, arranging the bricks on the super flat prefabricating pedestal which has already laid a demolding barrier layer, and filling joints of the bricks through caulking strips; mounting first reserving hole molds after completing a reverse laying of the bricks, then laying a layer of polymer dry mix mortar with a thickness of 8 mm~10 mm on a back of the bricks; and after a final set of the polymer dry mix mortar, mounting a first reinforcing mesh sheet, second reserving hole molds, a second reinforcing mesh sheet and pre-embedding steel slabs, fixing the threaded sleeves on the pre-embedding steel slabs respectively, and opening a grouting hole on each of the pre-embedding steel slabs; after completing above steps, pouring a concrete to finally form one complete piece of the prefabricating slabs; after a concrete strength reaches 75% of a design strength, cooperating with a crane to flip the side mold at a sand pile, checking an evenness and a specification dimension of a brick surface of the prefabricating slabs, and promptly taking out the caulking strips from qualified prefabricating slabs and pointing the joints, and then numbering and storing the prefabricating slabs; and wherein the second reserving hole molds and the first reserving hole molds are mounted at positions corresponding to the threaded sleeves, when pouring the concrete inside the side mold, and insides of the second reserving hole molds and the first reserving hole molds are not poured, and bricks at positions corresponding to the first reserving hole molds are taken out, and the positions corresponding to the first reserving hole molds serve as leveling and grouting reserving holes.

2. The top-down construction type assembly construction method for paved road surface according to claim 1, wherein, each of the prefabricating slabs is provided with four threaded sleeves; at the altitude coarse tuning, the leveling bolts are simultaneously rotated in one direction by two workers, four screw bolts of one same prefabricating slab are adjusted slowly and evenly, one of the screw bolts is rotated up to 1-2 turns, and then a next one of screw bolts is rotated, and a cycle is repeated until the altitude of the slab surface of the prefabricating slabs is consistent with that of the string line; at the altitude fine tuning, each of screw bolts is adjusted half-turn, and then the next one of screw bolts is adjusted, and the cycle is repeated; after adjustment, each of the screw bolts is in effective contact with a surface of the lower bearing plate so that the prefabricating slabs do not shake; when adjusting the altitude, a ruler is configured for checking the evenness between the ruler and surrounding prefabricating slabs, to meet an evenness requirement specified in a design.

3. The top-down construction type assembly construction method for paved road surface according to claim 1, wherein, in the step II, an ink line grid is previously drawn on the concrete surface of the lower bearing plate; when placing the prefabricating slabs in the one step according to the mounting sequence of the mounting section, a wooden strip with a width equal to that of each joint between the prefabricating slabs is made into clamping strips to control joints between the prefabricating slabs; when laying the prefabricating slabs, the clamping strips are configured to control the joints between the prefabricating slabs; the clamping strips are placed against four corners of the prefabricating slabs, and the prefabricating slabs are placed within the ink line grid during a laying process.

4. The top-down construction type assembly construction method for paved road surface according to claim 1, wherein, in the step II, after the tuning of the mounting section is completed, the grouting construction is timely performed, and before the grouting construction, gaps between the surrounding prefabricating slabs and the lower bearing plate and joints between the prefabricating slabs are sealed with cement mortar; then the grouting construction is started to fill a leveling space between the prefabricating slabs and the surface of the lower bearing plate, as well as the gap between the prefabricating slabs of adjacent prefabricating slabs; an electronic level is configured for monitoring whether the prefabricating slabs are raised in real-time during the grouting construction, and the elevation and the evenness of all prefabricating slabs are immediately checked after the grouting construction is completed, and the elevation and the evenness of all prefabricating slabs are adjusted in a timely manner before slurry solidifies.

5. The top-down construction type assembly construction method for paved road surface according to claim 4, wherein, before the grouting construction, dust and impurities in the leveling space are purged with compression air through the grouting hole.

6. The top-down construction type assembly construction method for paved road surface according to claim 1, wherein, the grouting hole is reserved at the four corners of the prefabricating slabs, with a distance of 1-2 bricks from an edge of the prefabricating slabs; a diameter q of the grouting hole is 20 mm.

7. The top-down construction type assembly construction method for paved road surface according to claim 1, wherein, after the grouting construction is completed, the bricks at the leveling and grouting reserving holes are placed back, and pointing joints between the prefabricating slabs; after the pointing is completed, the road surface is cleaned, and an installation of the prefabricating slabs on the road surface is completed.

8. The top-down construction type assembly construction method for paved road surface according to claim 1, wherein, a concrete cushion block is placed on the first reinforcing mesh sheet to pad a concrete lower protection layer with a thickness of 2±0.2 cm; the second reinforcing mesh sheet is supported on the first reinforcing mesh sheet through stirrup reinforcements, and a concrete upper protection layer is formed with a thickness of 3±0.3 cm on an upper side of the first reinforcing mesh sheet; before mounting the second reinforcing mesh sheet, the pre-embedding steel slabs are mounted and welded to the first reinforcing mesh sheet; afterwards, the second reserving hole molds are respectively placed on the pre-embedding steel slabs and finally the second reinforcing mesh sheet is mounted.

9. The top-down construction type assembly construction method for paved road surface according to claim 8, wherein, sides of the side mold are provided with lift holes, and each of the lift holes is provided at a position 0.21 times an edge length from an end head, with two lift holes provided on each side of an outer side surface of the side mold, and lift hole pre-embedding pieces corresponding to the lift holes are fixedly connected to the first reinforcing mesh sheet through a connecting reinforcement.

* * * * *